US 11,698,495 B2

(12) United States Patent
Inoue (10) Patent No.: US 11,698,495 B2
(45) Date of Patent: Jul. 11, 2023

(54) METHOD FOR MANUFACTURING FAN-IN FAN-OUT DEVICE AND FAN-IN FAN-OUT DEVICE

(71) Applicant: SUMITOMO ELECTRIC INDUSTRIES, LTD., Osaka (JP)

(72) Inventor: Ayumi Inoue, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/321,844

(22) Filed: May 17, 2021

(65) Prior Publication Data
US 2021/0356675 A1 Nov. 18, 2021

(30) Foreign Application Priority Data

May 18, 2020 (JP) .................................. 2020-086783

(51) Int. Cl.
*G02B 6/36* (2006.01)
*C03B 37/028* (2006.01)

(52) U.S. Cl.
CPC ............ *G02B 6/368* (2013.01); *C03B 37/028* (2013.01); *G02B 6/3636* (2013.01)

(58) Field of Classification Search
CPC ...... G02B 6/368; G02B 6/3636; C03B 37/028
See application file for complete search history.

(56) References Cited

U.S. PATENT DOCUMENTS

| 6,400,873 | B1* | 6/2002 | Gimblet | G02B 6/4433 |
| | | | | 385/103 |
| 7,277,615 | B2* | 10/2007 | Greenwood | G02B 6/4494 |
| | | | | 385/100 |
| 8,693,088 | B2* | 4/2014 | Fini | G02B 6/2856 |
| | | | | 359/334 |
| 2005/0013546 | A1* | 1/2005 | Nakamura | G02B 6/3652 |
| | | | | 385/49 |
| 2014/0301704 | A1* | 10/2014 | Tanaka | G02B 6/4409 |
| | | | | 385/128 |
| 2014/0369659 | A1 | 12/2014 | Uemura et al. | |
| 2018/0301245 | A1* | 10/2018 | Glew | G02B 6/443 |

FOREIGN PATENT DOCUMENTS

JP       2015-001673 A       1/2015

* cited by examiner

*Primary Examiner* — Sung H Pak
*Assistant Examiner* — Hoang Q Tran
(74) *Attorney, Agent, or Firm* — Oliff PLC (57) ABSTRACT

A method for manufacturing a fan-in-fan-out device which does not require processing of a small-diameter hole and improves work efficiency of installation of an optical fiber, includes: arranging a first holding member in a hole of a second holding member, the hole being larger than an outer diameter of the first holding member, and holding a plurality of optical fibers between the first holding member and the second holding member respectively along a plurality of grooves formed on an outer periphery of the first holding member or an inner periphery of the hole of the second holding member; heating and integrally melting the arranged first holding member, the plurality of held optical fibers, and the second holding member in a portion including an axial end portion of the second holding member; and drawing the melted portion.

10 Claims, 11 Drawing Sheets

FIG.10

METHOD FOR MANUFACTURING FAN-IN FAN-OUT DEVICE AND FAN-IN FAN-OUT DEVICE

CROSS-REFERENCE TO RELATED APPLICATIONS

This application is based on and claims priority under 35 USC 119 from Japanese Patent Application No. 2020-086783 filed on May 18, 2020, the contents of which are incorporated herein by reference.

TECHNICAL FIELD

The present disclosure relates to a method for manufacturing a fan-in fan-out device and a fan-in fan-out device.

BACKGROUND

A fan-in fan-out device that connects a multicore fiber and a single-core fiber is known.

JP-A-2015-001673 discloses a method for manufacturing a fan-in fan-out device in which a single-core fiber is inserted into each of small-diameter holes of capillaries having as many the small-diameter holes as the number of cores of a multicore fiber to be connected, and a part of the capillaries is heated and melted together with the inserted single-core fibers, whereby the melted single-core fibers and the capillaries are drawn.

SUMMARY

The present disclosure provides a method for manufacturing a fan-in fan-out device, which does not require processing of a small-diameter hole and improves work efficiency of installation of a single-core fiber.

In order to solve the above problem, there is provided a method for manufacturing a fan-in fan-out device including: a first step of arranging a first holding member in a hole of a second holding member, the hole being larger than an outer diameter of the first holding member, and holding a plurality of optical fibers between the first holding member and the second holding member respectively along a plurality of grooves formed on an outer periphery of the first holding member or an inner periphery of the hole of the second holding member; a second step of heating and integrally melting the arranged first holding member, the plurality of held optical fibers, and the second holding member in a portion including an axial end portion of the second holding member; and a third step of drawing the melted portion.

A fan-in fan-out device according to the present disclosure includes: a plurality of optical fibers; and a holding portion holding the plurality of optical fibers in a bundled state, in which the holding portion includes: a large-diameter portion; a reduced-diameter portion extending from the large-diameter portion while reducing in diameter; and a small-diameter portion extending from the reduced-diameter portion. The large-diameter portion includes: a first holding member; and a second holding member having a hole larger than an outer diameter of the first holding member. An outer periphery of the first holding member or an inner periphery of the hole of the second holding member has a plurality of grooves. The plurality of optical fibers are held between the first holding member and the second holding member respectively along the plurality of grooves in the large-diameter portion. The first holding member and the second holding member are melted and integrated with each other in the small-diameter portion.

According to the present disclosure, a method for manufacturing a fan-in fan-out device can be provided, which does not require processing of a small-diameter hole and improves work efficiency of installation of an optical fiber.

DETAILED DESCRIPTION

First, illustrative embodiments of the present disclosure will be listed and described. A method for manufacturing a fan-in fan-out device according to an aspect of the present disclosure is the method for manufacturing the fan-in fan-out device using a first holding member and a second holding member, in which the second holding member has a hole larger than an outer diameter of the first holding member, and a plurality of grooves are formed on an outer periphery of the first holding member or an inner periphery of the hole of the second holding member. The method includes: a first step of arranging the first holding member in the hole of the second holding member and holding a plurality of optical fibers between the first holding member and the second holding member respectively along the plurality of grooves; a second step of heating and integrally melting the arranged first holding member, the plurality of held optical fibers, and the second holding member in a portion including an axial end portion of the second holding member; and a third step of stretching the melted portion.

According to the manufacturing method of the present disclosure, since the optical fibers are held between the first holding member and the second holding member, processing of a plurality of small-diameter holes in a holding member is not required. Since insertion of the optical fibers into the small-diameter holes is not required and the optical fibers are easily positioned by the grooves, work efficiency of installation of the optical fibers can be improved.

The first step of the method for manufacturing the fan-in fan-out device according to the aspect of the present disclosure may include arranging the first holding member in the hole of the second holding member, after arranging the plurality of optical fibers in the plurality of grooves. Alternatively, the first step may include arranging the plurality of optical fibers between the first holding member and the second holding member along the plurality of grooves, after arranging the first holding member in the hole of the second holding member. According to the manufacturing method of the present disclosure, since the optical fibers are arranged in a relatively wide space between the first holding member and the second holding member, the optical fibers are arranged more easily than a case where the optical fibers are inserted into the small-diameter holes. Therefore, the work efficiency of the installation of the optical fibers can be improved.

In the method for manufacturing the fan-in fan-out device according to the aspect of the present disclosure, the plurality of grooves may be formed on the outer periphery of the first holding member. Alternatively, the plurality of grooves may be formed on the inner periphery of the hole of the second holding member.

In the method for manufacturing the fan-in fan-out device according to the aspect of the present disclosure, the second holding member may include a third holding member and a fourth holding member, and the first step may include holding the plurality of optical fibers by arranging the first holding member between the third holding member and the fourth holding member. According to the manufacturing method of the present disclosure, since the second holding member includes the third holding member and the fourth holding member, the first holding member is easily installed inside the second holding member.

In the method for manufacturing the fan-in fan-out device according to the aspect of the present disclosure, the hole may have a circular cross section perpendicular to a longitudinal direction. Alternatively, the hole may have a rectangular cross section perpendicular to a longitudinal direction. The groove may have a V-shaped cross section perpendicular to the longitudinal direction. According to the manufacturing method of the present disclosure, since the groove has a V shape, the optical fiber comes into contact with the V-shaped groove at two positions in the groove in a cross-sectional view. When the optical fiber is arranged in the small-diameter hole or a semicircular groove, a gap (a clearance) is generated between the optical fiber and the small-diameter hole or the groove. On the other hand, when the groove has the V shape as in the present disclosure, the optical fiber can be brought into contact with the groove and positioned with high accuracy without generating the gap between the optical fiber and the groove.

A fan-in fan-out device according to an aspect of the present disclosure includes: a plurality of optical fibers; and a holding portion holding the plurality of optical fibers in a bundled state. The holding portion includes: a large-diameter portion, a reduced-diameter portion extending from the large-diameter portion while reducing in diameter, and a small-diameter portion extending from the reduced-diameter portion. The large-diameter portion includes: a first holding member, and a second holding member having a hole larger than an outer diameter of the first holding member. A plurality of grooves are formed on an outer periphery of the first holding member or an inner periphery of the hole of the second holding member. The plurality of optical fibers are held between the first holding member and the second holding member respectively along the plurality of grooves in the large-diameter portion. The first holding member and the second holding member are melted and integrated with each other in the small-diameter portion. According to the present disclosure, the fan-in fan-out device with a reduced manufacturing cost can be provided.

Details of First Illustrative Embodiment of Present Disclosure

In the manufacturing method disclosed in JP-A-2015-001673, the small-diameter hole needs to be processed small, and an advanced processing technology is required. For example, when a fiber outer diameter is 125 µm, an inner diameter of the small-diameter hole is about 130 µm, and a highly accurate drilling technology is required to process such a small-diameter hole. Since the single-core fiber is inserted into each of the small-diameter holes corresponding to the number of cores of the multicore fiber, arrangement of the optical fibers may be difficult. Therefore, the present disclosure provides a method for manufacturing a fan-in fan-out device, which does not require processing of a small-diameter hole and improves work efficiency of installation of a single-core fiber.

A fan-in fan-out device 100 and a method for manufacturing the fan-in fan-out device 100 according to an illustrative embodiment of the present disclosure will be described with reference to the drawings. The present disclosure is not limited to these examples but defined by the scope of the claims, and is intended to include meanings equivalent to the scope of the claims and all modifications within the scope.

Figure 1:
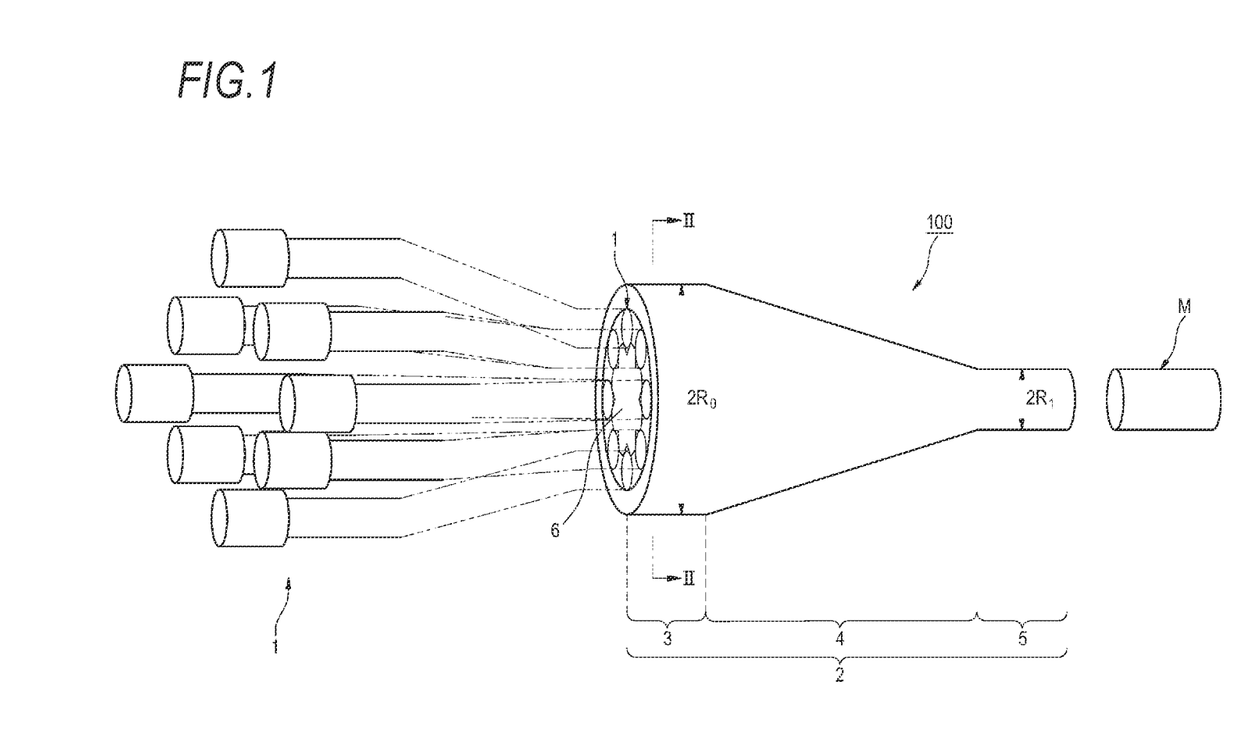
FIG. 1 is a perspective view of a fan-in fan-out device according to a first illustrative embodiment of the present disclosure.

FIG. 1 is a perspective view of the fan-in fan-out device 100 according to the illustrative embodiment of the present disclosure. The fan-in fan-out device 100 includes a plurality of optical fibers 1 and a holding portion 2 that holds the plurality of optical fibers 1 in a bundled state. The holding portion 2 includes a large-diameter portion 3, a reduced-diameter portion 4 extending from the large-diameter portion 3 while reducing in diameter, and a small-diameter portion 5 extending from the reduced-diameter portion 4.

The plurality of optical fibers 1 held by the large-diameter portion 3 are configured to be optically connected to a plurality of external optical fibers (not shown), respectively. The external optical fiber is, for example, a single-mode fiber. The plurality of optical fibers 1 held by the small-diameter portion 5 are configured to be optically connected to a plurality of cores of an external multicore fiber M, respectively. The fan-in fan-out device 100 is configured to transmit light incident on each external optical fiber to one corresponding core of the external multicore fiber M via the large-diameter portion 3, the reduced-diameter portion 4 and the small-diameter portion 5. Similarly, the fan-in fan-out device 100 is configured to transmit light incident on each core of the external multicore fiber M to one corresponding external optical fiber via the small-diameter portion 5, the reduced-diameter portion 4 and the large-diameter portion 3.

Figure 2:
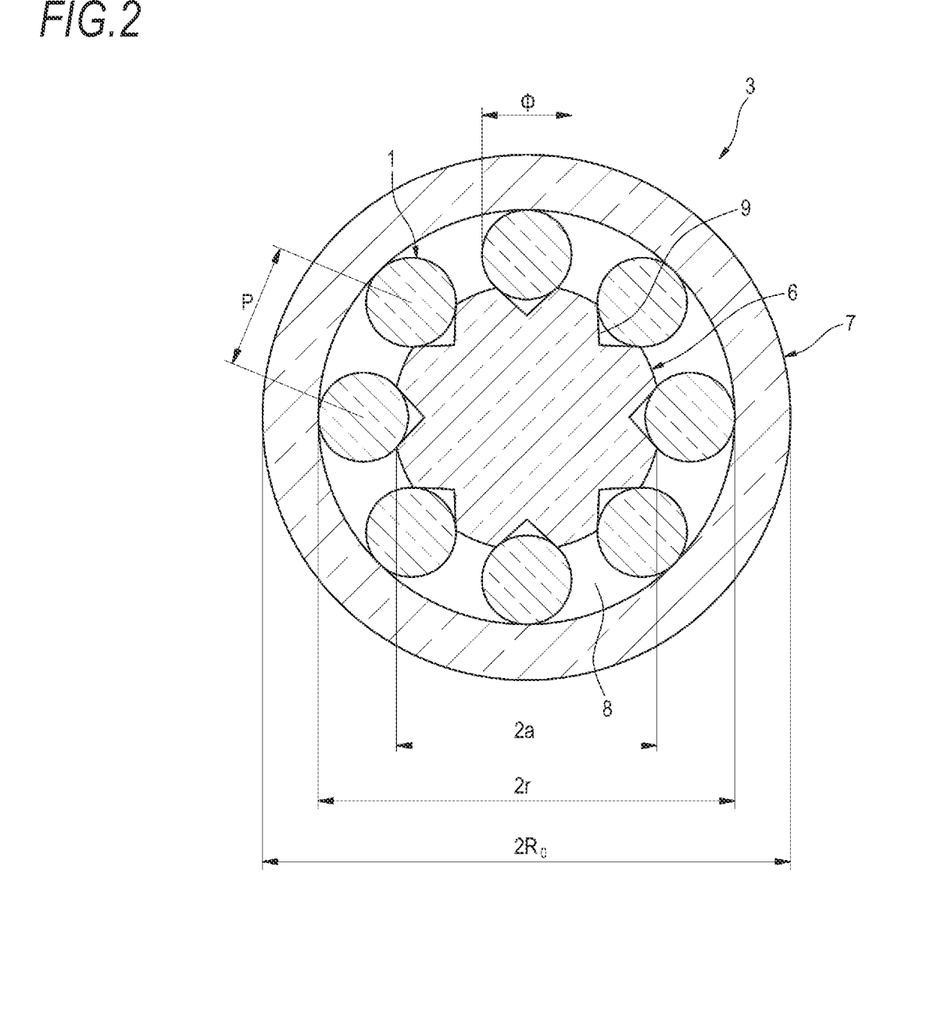
FIG. 2 is a cross-sectional view of a large-diameter portion of the fan-in fan-out device in FIG. 1.

FIG. 2 shows a cross-sectional view of the large-diameter portion 3 of the fan-in fan-out device 100. The large-diameter portion 3 includes a grooved rod (a first holding member) 6 and a tube (a second holding member) 7 having a hole 8 larger than an outer diameter of the grooved rod 6. The plurality of optical fibers 1 are held between the grooved rod 6 and the tube 7. An outer diameter of the optical fiber 1 in the large-diameter portion 3 is, for example, 125 µm. The number of the plurality of optical fibers 1 is eight in the first illustrative embodiment, but is not limited to eight.

A plurality of V-shaped grooves 9 are formed on an outer circumference of the grooved rod 6 according to the number of optical fibers 1 to be held. A shape of each of the plurality of grooves 9 is a V shape in the first illustrative embodiment, but may be a notch, a semicircle or a rectangle. The plurality of optical fibers 1 are respectively held along the plurality of grooves 9.

Figure 3:
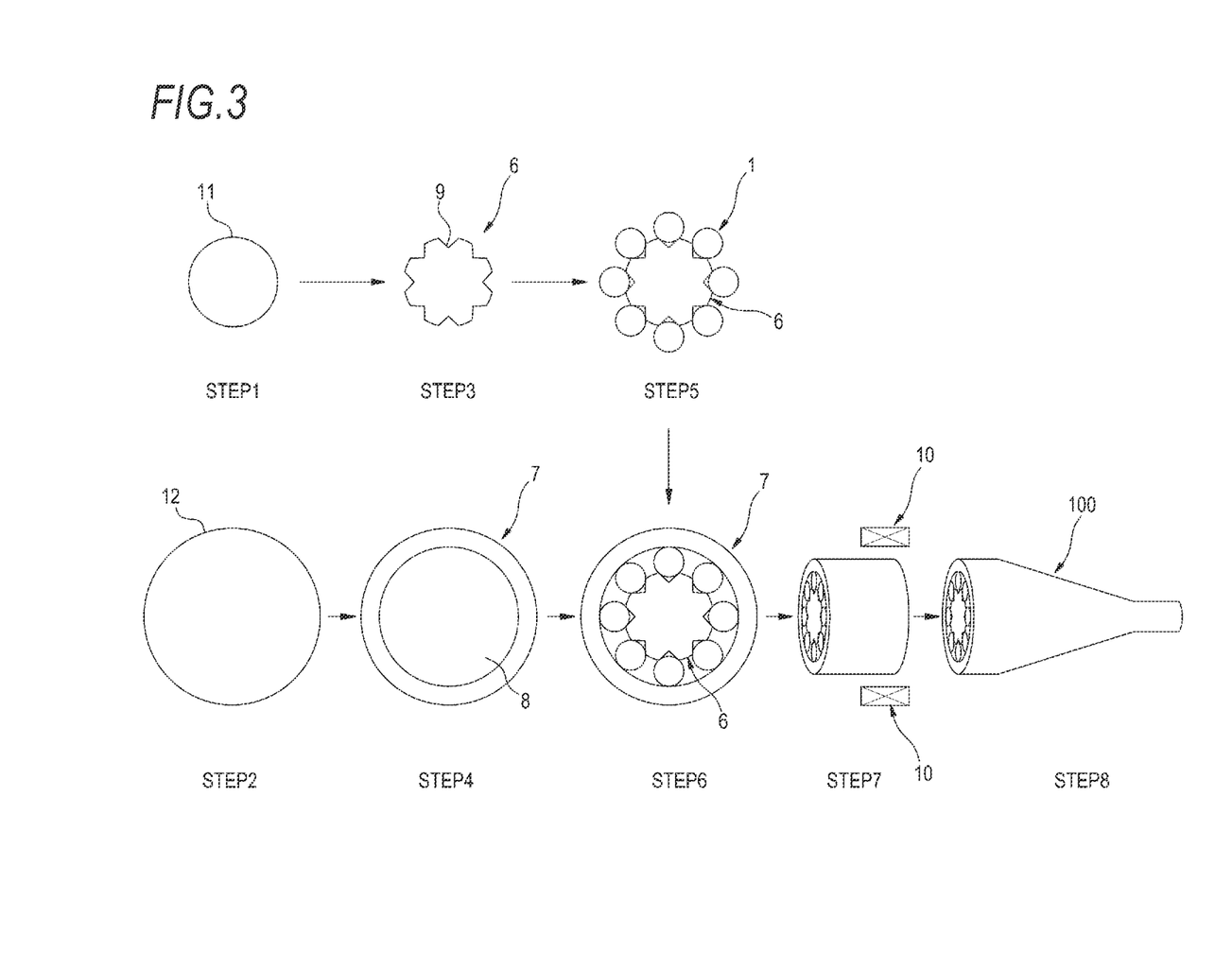
FIG. 3 is a process view of a method for manufacturing the fan-in fan-out device in FIG. 1.

FIG. 3 is a process view of a method for manufacturing the fan-in fan-out device 100. First, a base material 11 of the grooved rod 6 is prepared (STEP 1). A material of the base material 11 is, for example, quartz glass, and has a cylindrical shape. Similarly, a base material 12 of the tube 7 is prepared (STEP 2). A material of the base material 12 is, for example, quartz glass, and has a cylindrical shape. A size of the base material 12 of the tube 7 is a size capable of accommodating therein the plurality of optical fibers 1 and the base material 11 of the grooved rod 6.

The plurality of V-shaped grooves 9 are formed on the outer circumference of the base material 11 of the grooved rod 6 prepared in STEP 1, and the grooved rod 6 is obtained (STEP 3). As a processing method of the groove 9, for example, in cutting, the outer circumference of the base material 11 is cut along an axial direction of the base material 11 by a cutting blade having a V-shaped angle. The plurality of grooves 9 may be formed by laser processing. Since laser processing does not require a cutting blade, a degree of freedom of processing is higher than that of cutting. When an ultrashort wavelength pulse laser is used, processing with higher accuracy is possible. In any processing method, after a cutting blade or laser forms one groove, the base material 11 is rotated around a central axis of the base material 11, and an outer circumferential surface of the base material 11 to be formed next is arranged in front of the cutting blade or a laser emitting unit. Then, the cutting blade or laser may form the next groove. A processing accuracy of the grooves is, for example, ±0.5 µm with respect to a pitch of 100 µm of the grooves 9.

In the manufacturing method shown by FIG. 3, the cylindrical base material 11 is prepared (STEP 1), and the plurality of grooves 9 are formed on the outer circumference of the base material 11 (STEP 3). However, the grooved rod 6 already having a plurality of grooves on the outer circumference may be prepared.

The hole 8 larger than the outer diameter of the grooved rod 6 is formed in the base material 12 of the tube 7 prepared in STEP 2, and the tube 7 is obtained (STEP 4). A shape of the hole 8 is, for example, circular in a cross-sectional view. A central axis of the tube 7 and a central axis of the hole 8 may coincide with each other. The hole 8 may be formed by, for example, drilling with a drill or laser processing. Since laser processing does not require a drill blade, a processing accuracy and a degree of freedom are higher than those of drilling with a drill.

In the manufacturing method shown by FIG. 3, the cylindrical base material 12 is prepared (STEP 2), and the hole 8 is formed in the base material 12 (STEP 4). However, the tube 7 already having a hole larger than the outer diameter of the grooved rod 6 may be prepared. STEP 2 and STEP 4 may be performed before STEP 1 and STEP 3.

Next, the plurality of optical fibers 1 are respectively arranged along the plurality of grooves 9 formed on the outer circumference of the grooved rod 6 (STEP 5). As an example of an arrangement method, a volatile liquid may be used. When the volatile liquid is applied to a surface of the grooved rod 6 or surfaces of the optical fibers 1, the optical fibers 1 are temporarily fixed to the grooved rod 6 by a self-aggregative force due to surface tension of the volatile liquid. In this way, the optical fibers 1 are arranged in the grooves 9 of the grooved rod 6. The volatile liquid is, for example, alcohol or water. STEP 5 may be performed before STEP 2 and STEP 4.

After the plurality of optical fibers 1 are arranged in the plurality of grooves 9 of the grooved rod 6, the grooved rod 6 is arranged in the hole 8 of the tube 7 together with the plurality of optical fibers 1 (STEP 6). A central axis of the grooved rod 6 may coincide with the central axis of the tube 7. When the grooved rod 6 is arranged in the hole 8, the plurality of optical fibers 1 temporarily fixed to the grooved rod 6 are held along the plurality of grooves 9 between the grooved rod 6 and the tube 7. In the present disclosure, arrangement of the plurality of optical fibers 1 and insertion of the grooved rod 6 into the hole 8 of the tube 7 (STEP 5 and STEP 6 in FIG. 3) are a first step.

After the first step, together with the grooved rod 6 and the plurality of optical fibers 1, one end portion of the tube 7 in the axial direction is arranged in a heating unit. The heating unit is, for example, a cylindrical core tube 10 in a heating furnace. The cylindrical core tube 10 integrally heats and melts the arranged grooved rod 6, the plurality of held optical fibers 1, and the tube 7 in a portion of the tube 7 including one end portion (STEP 7). The heating unit is not limited to the cylindrical core tube 10, and may be a burner. In the present disclosure, the heating and melting step (STEP 7) is a second step.

After the second step, the melted portion is drawn to form the fan-in fan-out device 100 (STEP 8). A portion that is not drawn (including the other end portion of the grooved rod 6 and the other end portion of the tube 7) and has a constant outer diameter in the axial direction is the large-diameter portion 3. A portion that is drawn and has an outer diameter reduced from the large-diameter portion 3 to the small-diameter portion 5 is the reduced-diameter portion 4. A portion that is drawn (including one end portion of the grooved rod 6 and one end portion of the tube 7) and extends from the reduced-diameter portion 4 along the axial direction is the small-diameter portion 5. An outer diameter of the small-diameter portion 5 may be constant in the axial direction. The plurality of optical fibers 1 are integrated into the grooved rod 6 and the tube 7 via STEP 7 and STEP 8. Therefore, the plurality of grooves 9 in the reduced-diameter portion 4 gradually decrease in size from a large-diameter portion 3 side toward the small-diameter portion 5 side. The plurality of grooves 9 in the small-diameter portion 5 are small enough not to be visually recognized, or are integrated with the grooved rod 6 and the tube 7 to be invisible. In the present disclosure, the stretching step (STEP 8) is a third step.

As described above, in the method for manufacturing the fan-in fan-out device 100 according to the present disclosure, since the plurality of optical fibers 1 are held between the grooved rod 6 and the tube 7, processing of a plurality of small-diameter holes for holding the optical fibers in the rod is not required. For example, when the fiber outer diameter is as small as 125 µm, processing of the plurality of small-diameter holes having an inner diameter of 130 µm, for example, as small holes corresponding to the fiber outer diameter, is not required, and a high processing technology and high accuracy are required. However, according to the manufacturing method of the present disclosure, required processing is formation of the grooves and processing of the hole 8 larger than the outer diameter of the grooved rod 6, and is easier than processing of the small-diameter holes. Therefore, work efficiency of the manufacturing method is improved.

The plurality of optical fibers 1 are collectively arranged in the hole of the tube 7 (the second holding member) together with the grooved rod 6 (the first holding member) in a state of being arranged (temporarily fixed) respectively along the plurality of grooves 9 of the grooved rod 6. Therefore, insertion of the optical fiber into a narrow space is not required, and efficiency of installation work of the optical fiber is improved as compared with a case where the individual optical fibers are inserted into the individual small-diameter holes.

Since the plurality of grooves 9 are formed on the outer circumference of the grooved rod 6, the plurality of optical fibers 1 can be positioned with high accuracy with respect to the grooved rod 6 (the first holding member). Further, as compared with a case where the small-diameter holes for holding the optical fibers are processed, an advanced processing technology is not required.

Since a shape of the hole 8 is circular, the fan-in fan-out device 100 corresponding to the external multicore fiber M in which the plurality of cores are arranged in an annular shape can be manufactured.

Since each groove 9 has a V shape, each optical fiber 1 comes into contact with two positions in the corresponding groove 9 in a cross-sectional view. When the optical fiber is arranged in the small-diameter hole or a semicircular groove, a gap (a clearance) is generated between the optical fiber and the small-diameter hole or the groove. On the other hand, when the groove 9 has the V shape as in the first illustrative embodiment, the optical fiber 1 can be brought into contact with the groove 9 and positioned with high accuracy without generating the gap between the optical fiber 1 and the groove 9.

Figure 4:
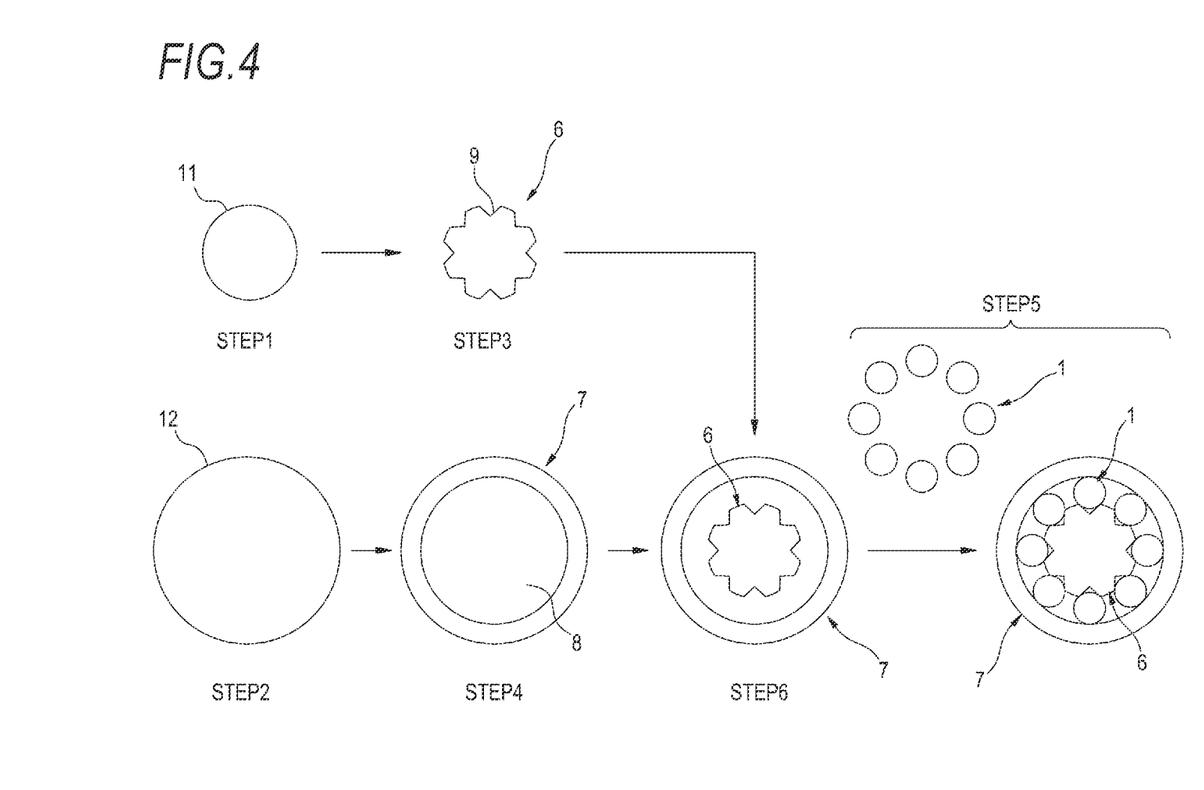
FIG. 4 is a process view when an order of a part of steps is changed in the manufacturing method in FIG. 3.

FIG. 3 shows an example in which the plurality of optical fibers 1 are arranged in the plurality of grooves 9 of the grooved rod 6 (STEP 5), and then the grooved rod 6 is arranged in the hole 8 of the tube 7 together with the plurality of optical fibers 1 (STEP 6), but the order is not limited thereto. FIG. 4 is a process view when an order of a part of steps is changed in the manufacturing method in FIG. 3. In a manufacturing method in FIG. 4, the order of STEP 5 and STEP 6 is reversed with respect to that of the manufacturing method in FIG. 3. STEPS 1 to 4, STEP 7 and STEP 8 in FIG. 4 are the same as those in FIG. 3. In FIG. 4, elements substantially the same as or corresponding to those in a configuration exemplified in FIG. 3 are denoted by the same reference numerals, and repeated description thereof will be omitted.

As shown in FIG. 4, after the plurality of grooves 9 are formed (STEP 3) and the hole 8 is formed (STEP 4), the grooved rod 6 is arranged in the hole 8 of the tube 7 (STEP 6). That is, in FIG. 4, after the grooved rod 6 is arranged in the hole 8 of the tube 7 (STEP 6), the optical fibers 1 are arranged between the grooved rod 6 and the tube 7 (STEP 5).

According to the illustrative embodiment depicted in FIG. 4, the plurality of optical fibers 1 are inserted into a space between the grooved rod 6 and the tube 7, which is relatively wider than the small-diameter hole. Therefore, efficiency of installation work of the optical fiber is improved as compared with the case where the optical fiber is inserted into the small-diameter hole.

First Modification of First Illustrative Embodiment

Figure 5:
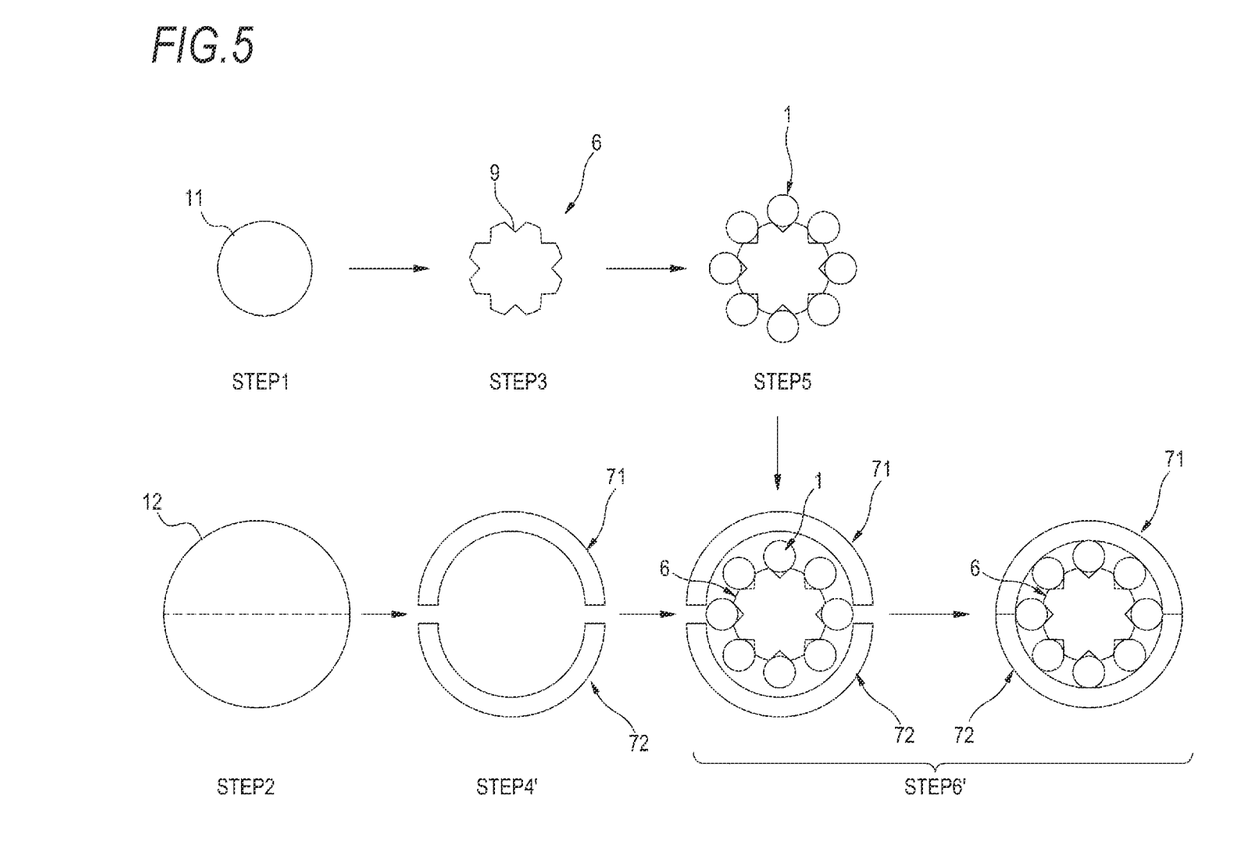
FIG. 5 is a process view of a modification of the manufacturing method in FIG. 3.

In the illustrative embodiment in FIG. 3 and FIG. 4, the hole 8 is formed in the base material 12 having the cylindrical shape to obtain the tube 7, but the present invention is not limited thereto. The tube 7 may be a member divided into a plurality of parts. FIG. 5 is a process view of a modification of the manufacturing method of the fan-in fan-out device 100. STEPS 1 to 3, STEP 5, STEP 7 and STEP 8 in FIG. 5 are the same as those in FIG. 3. In FIG. 5, elements substantially the same as or corresponding to those in a configuration exemplified in FIG. 3 are denoted by the same reference numerals, and repeated description thereof will be omitted.

In the first modification of the first illustrative embodiment, the hole 8 is formed in the base material 12 of the tube 7 prepared in STEP 2, and the tube 7 is divided into a first half body (a third holding member) 71 and a second half body (a fourth holding member) 72 (STEP 4').

After the plurality of optical fibers 1 are arranged in the plurality of grooves 9 of the grooved rod 6 (STEP 5), the grooved rod 6 is arranged between the first half body 71 and the second half body 72 together with the plurality of optical fibers 1 (STEP 6'). Specifically, the grooved rod 6 is arranged on one of the first half body 71 and the second half body 72 in a state where the plurality of optical fibers 1 are arranged on the grooved rod 6 respectively along the plurality of grooves 9. Thereafter, the other of the first half body 71 and the second half body 72 is arranged so as to be combined with one of the first half body 71 and the second half body 72. Since the grooved rod 6 is sandwiched between the first half body 71 and the second half body 72, the plurality of optical fibers 1 are held by the grooved rod 6, the first half body 71 and the second half body 72.

In this way, in the first modification of the first illustrative embodiment, since the tube 7 (the second holding member) is divided into the first half body 71 (the third holding member) and the second half body 72 (the fourth holding member), the grooved rod 6 and the plurality of optical fibers 1 are easily arranged between the first half body 71 and the second half body 72 constituting the tube 7. Therefore, work efficiency of the manufacturing method is improved.

FIG. 5 shows an example in which the tube 7 is divided into two, but the tube 7 may be divided into two or more. FIG. 5 shows an example in which the first half body 71 and the second half body 72 are prepared by dividing the tube 7, but the present invention is not limited to the division. The first half body 71 and the second half body 72 configured to be able to sandwich the grooved rod 6 and the plurality of optical fibers 1 may be prepared in advance.

Second Modification of First Illustrative Embodiment

Figure 6:
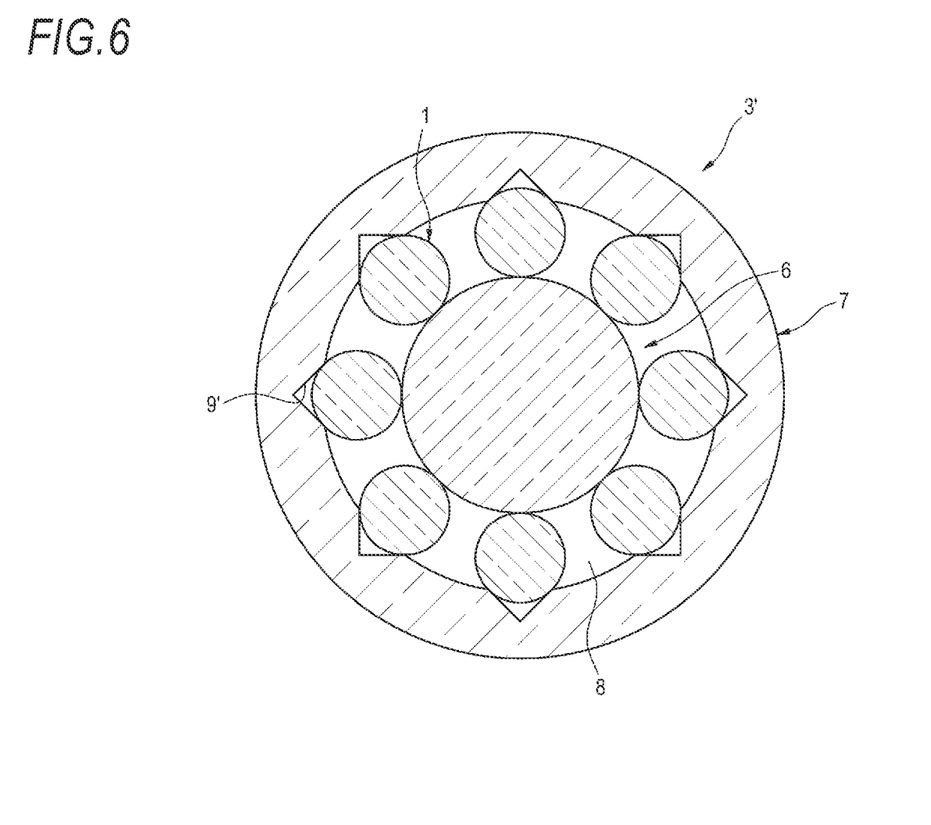
FIG. 6 is a cross-sectional view of a modification of the large-diameter portion in FIG. 2.

FIGS. 2 to 5 show an example in which the plurality of grooves 9 are formed on the outer circumference of the grooved rod 6, but positions of the plurality of grooves 9 are not limited to the outer circumference of the grooved rod 6. FIG. 6 shows a cross-sectional view of a large-diameter portion 3' as a second modification of the first illustrative embodiment. A plurality of grooves 9' may be formed on an inner circumference of the hole 8 of the tube 7. In FIG. 6, elements substantially the same as or corresponding to those in a configuration exemplified in FIG. 2 are denoted by the same reference numerals, and repeated description thereof will be omitted. Since steps of a method for manufacturing a fan-in fan-out device having a plurality of grooves 9' are the same as those in FIGS. 3 to 5, description thereof will be omitted.

According to the second modification of the first illustrative embodiment, since the plurality of grooves 9' are formed on the inner circumference of the hole 8 of the tube 7, the plurality of optical fibers 1 can be positioned with high accuracy with respect to the tube 7. Further, as compared with the case where the small-diameter holes for holding the optical fibers are processed, an advanced processing technology is not required.

Details of Second Illustrative Embodiment of Present Disclosure

Figure 7:
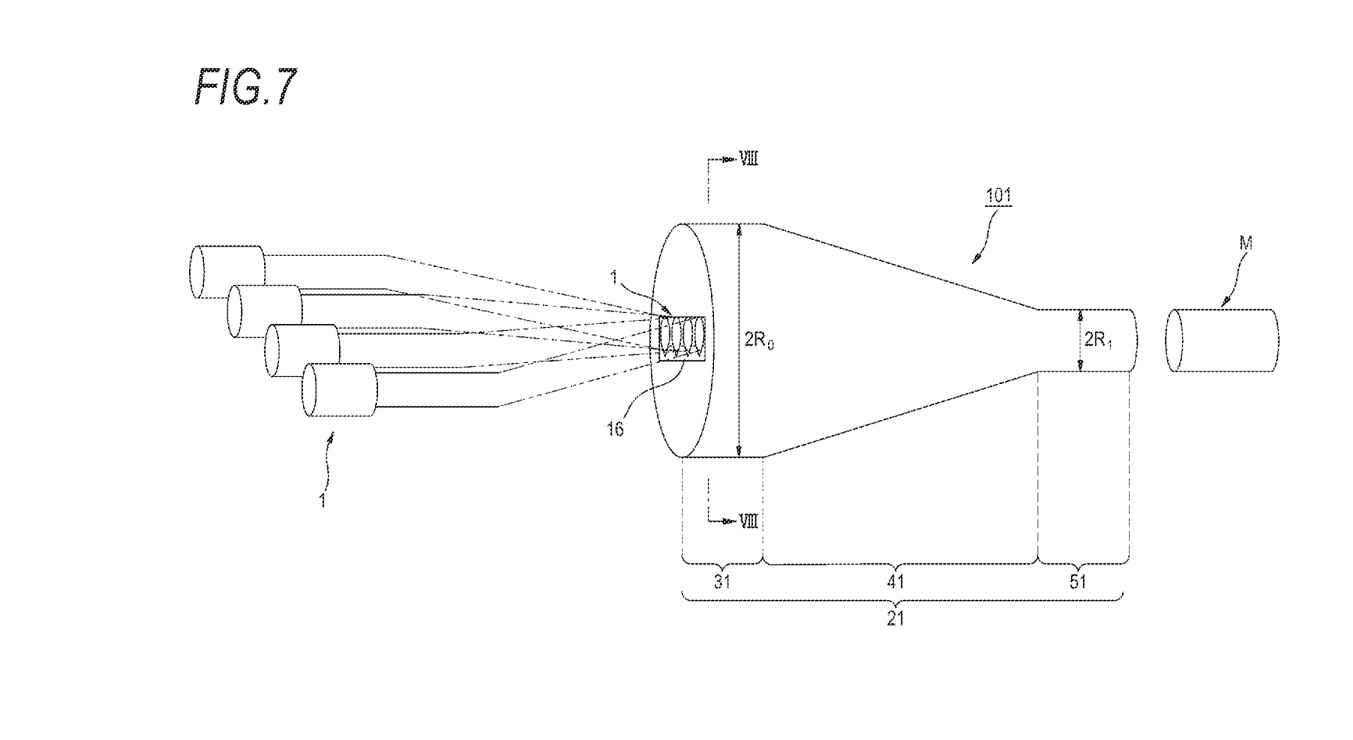
FIG. 7 is a perspective view of a fan-in fan-out device according to a second illustrative embodiment of the present disclosure.

FIG. 7 is a perspective view of a fan-in fan-out device 101 according to a second illustrative embodiment of the present disclosure. In FIG. 7, elements substantially the same as or corresponding to those in a configuration exemplified in FIG. 1 are denoted by the same reference numerals, and repeated description thereof will be omitted. The fan-in fan-out device 101 includes the plurality of optical fibers 1 and a holding portion 21 that holds the plurality of optical fibers 1 in a bundled state. The holding portion 21 includes a large-diameter portion 31, a reduced-diameter portion 41 extending from the large-diameter portion 31 while reducing in diameter, and a small-diameter portion 51 extends from the reduced-diameter portion 41.

Figure 8:
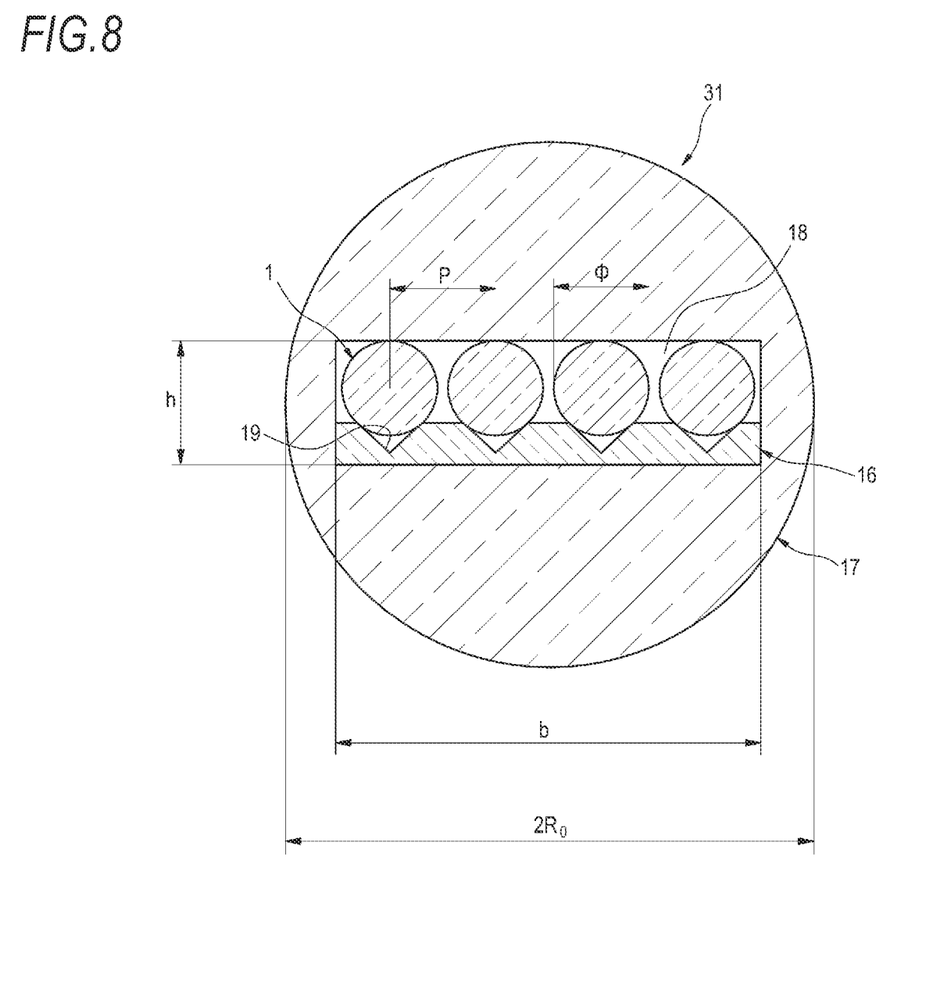
FIG. 8 is a cross-sectional view of a large-diameter portion of the fan-in-fan-out device in FIG. 7.

FIG. 8 shows a cross-sectional view of the large-diameter portion 31 of the fan-in fan-out device 101. The large-diameter portion 31 includes a grooved rod (a first holding member) 16 having a rectangular cross section orthogonal to a longitudinal direction, and a tube (a second holding member) 17 having a hole 18 capable of accommodating the grooved rod 16 and the plurality of optical fibers 1. The plurality of optical fibers 1 are held between the grooved rod 16 and the tube 17. An outer diameter of the optical fiber 1 in the large-diameter portion 31 is, for example, 125 A plurality of V-shaped grooves 19 are formed on a long side of the grooved rod 16 according to the number of optical fibers 1 to be held.

Figure 9:
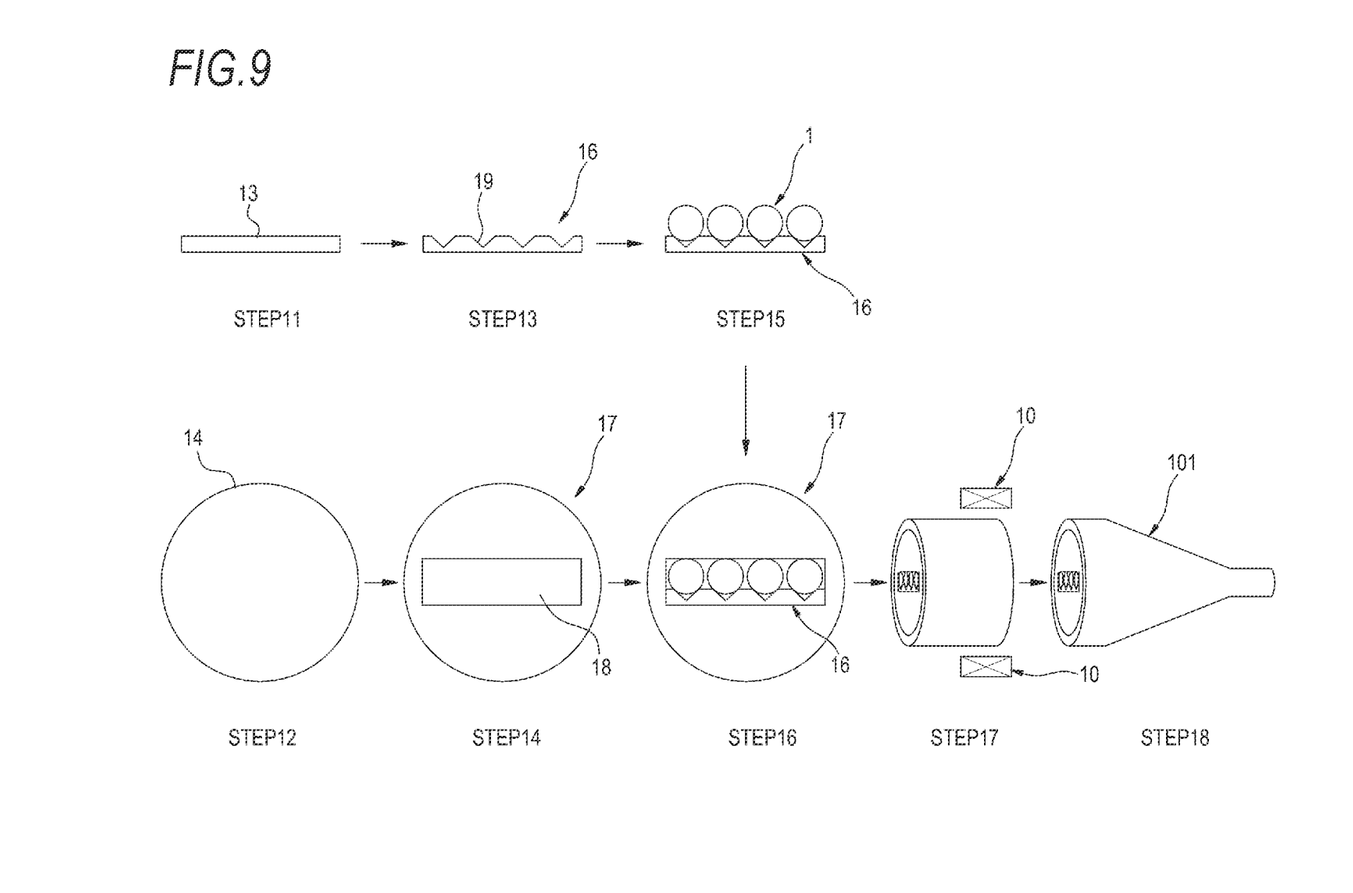
FIG. 9 is a process view of a method for manufacturing the fan-in fan-out device in FIG. 7.

Next, a method for manufacturing the fan-in fan-out device 101 will be described. FIG. 9 is a process view of the method for manufacturing the fan-in fan-out device 101. In FIG. 9, elements substantially the same as or corresponding to those in a configuration exemplified in FIG. 3 are denoted by the same reference numerals, and repeated description thereof will be omitted.

As shown in FIG. 9, a base material 13 of the grooved rod 16 is prepared (STEP 11). A material of the base material 13 is, for example, quartz glass, and has a rectangular parallelepiped shape. Similarly, a base material 14 of the tube 17 is prepared (STEP 12). A material of the base material 14 is, for example, quartz glass, and has a cylindrical shape. A size of the base material 14 of the tube 17 is a size capable of accommodating therein the plurality of optical fibers 1 and the grooved rod 16.

In the base material 13 of the grooved rod 16 prepared in STEP 11, the plurality of V-shaped grooves 19 are formed on one surface corresponding to a long side of the base material 13 in a cross-sectional view (a part of an outer periphery), and the grooved rod 16 is obtained (STEP 13). The plurality of grooves 19 may be formed by cutting or laser processing.

The hole 18 capable of accommodating the grooved rod 16 and the plurality of optical fibers 1 is formed in the base material 14 of the tube 17 prepared in STEP 12, and the tube 17 is obtained (STEP 14). A shape of the hole 18 is, for example, a rectangular shape in a cross-sectional view. A long side of the hole 18 is slightly larger than the long side of the grooved rod 16 (an example of an outer diameter), and a short side of the hole 18 is larger than a diameter of one optical fiber 1 and a short side of the grooved rod 16. A central axis of the tube 17 and a center of the long side that is a center of the short side of the hole 18 may coincide with each other. The hole 18 may be formed by, for example, drilling with a drill or laser processing.

Next, the plurality of optical fibers 1 are respectively arranged along the plurality of grooves 19 formed on the long side of the grooved rod 16 (STEP 15). As an example of an arrangement method, a volatile liquid may be used as in the first illustrative embodiment.

After the plurality of optical fibers 1 are arranged in the plurality of grooves 19 of the grooved rod 16, the grooved rod 16 is arranged in the hole 18 of the tube 17 together with the plurality of optical fibers 1 (STEP 16). Since the grooved rod 16 is arranged in the hole 18, the plurality of optical fibers 1 arranged in the grooved rod 16 are held along the plurality of grooves 19 between the grooved rod 16 and the tube 17. In the present disclosure, arrangement of the plurality of optical fibers 1 and insertion of the grooved rod 16 into the hole 18 of the tube 17 (STEP 15 and STEP 16 in FIG. 9) are a first step.

After the first step, together with the grooved rod 16 and the plurality of optical fibers 1, one end portion of the tube 17 in an axial direction is arranged in the cylindrical core tube 10 as a heating unit. The cylindrical core tube 10 integrally heats and melts the arranged grooved rod 16, the plurality of held optical fibers 1, and the tube 17 in a portion of the tube 17 including one end portion (STEP 17). In the present disclosure, the heating and melting step (STEP 17) is a second step.

After the second step, the melted portion is drawn to form the fan-in fan-out device 101 (STEP 18). In the present disclosure, the drawing step (STEP 18) is a third step.

In this way, in the method for manufacturing the fan-in fan-out device 101 according to the second illustrative embodiment, since the shape of the hole 18 is rectangular, the fan-in fan-out device 101 corresponding to the external multicore fiber M in which a plurality of cores are arranged in one direction can be manufactured.

Figure 10:
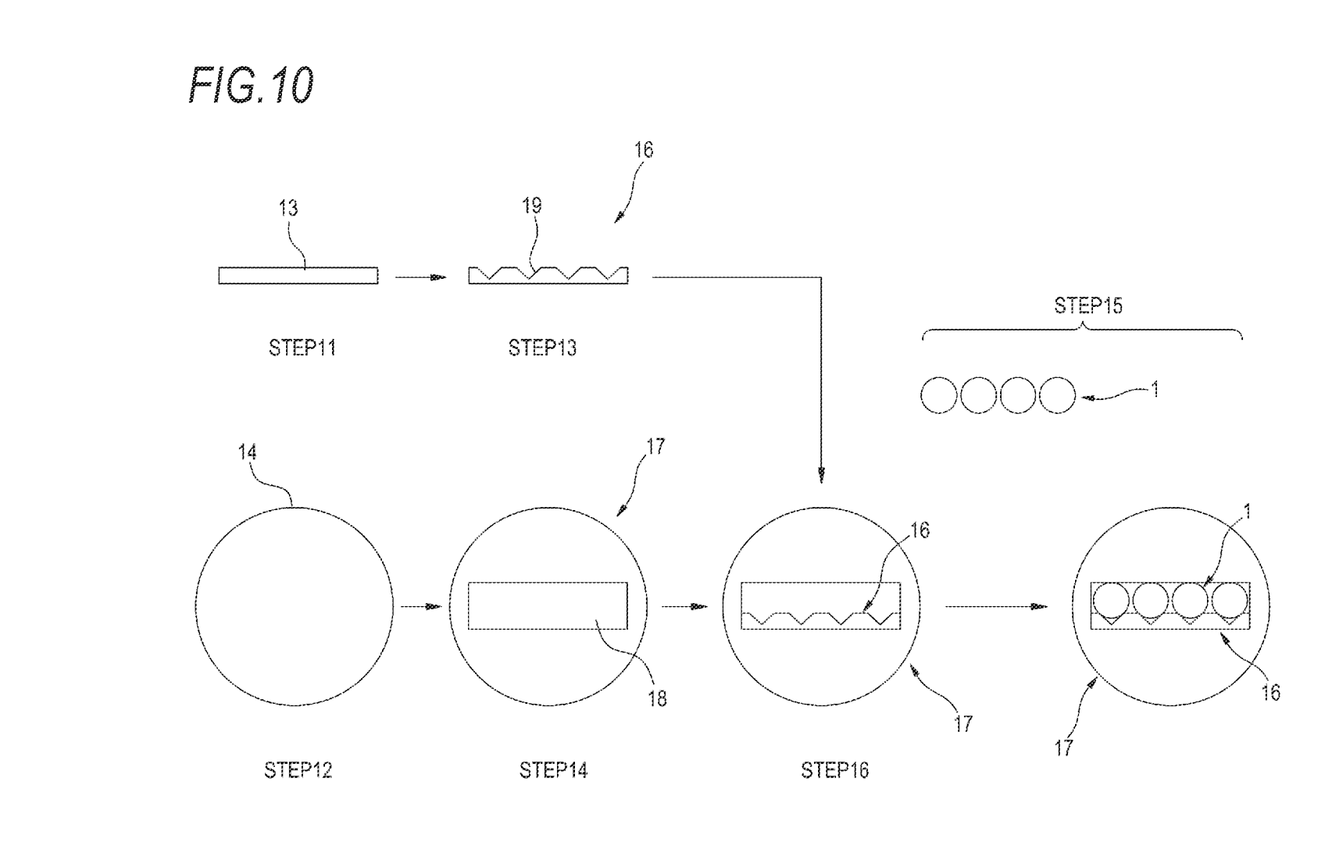
FIG. 10 is a process view when an order of a part of steps is changed in the manufacturing method in FIG. 9.

FIG. 9 shows an example in which the plurality of optical fibers 1 are arranged in the plurality of grooves 19 of the grooved rod 16 (STEP 15), and then the grooved rod 16 is arranged in the hole 18 of the tube 17 together with the plurality of optical fibers 1 (STEP 16), but the second illustrative embodiment is not limited to the order. FIG. 10 is a process view when an order of a part of steps is changed in the manufacturing method in FIG. 9. In a manufacturing method in FIG. 10, the order of STEP 15 and STEP 16 is reversed with respect to that of the manufacturing method in FIG. 9. STEPS 11 to 14, STEP 17 and STEP 18 in FIG. 10 are the same as those in FIG. 3. In FIG. 10, elements substantially the same as or corresponding to those in a configuration exemplified in FIG. 9 are denoted by the same reference numerals, and repeated description thereof will be omitted.

As shown in FIG. 10, after the plurality of grooves 19 are formed (STEP 13) and the hole 18 is formed (STEP 14), the grooved rod 16 is arranged in the hole 18 of the tube 17 (STEP 16). That is, in FIG. 10, after the grooved rod 16 is arranged in the hole 18 of the tube 17 (STEP 16), the optical fibers 1 are arranged between the grooved rod 16 and the tube 17 (STEP 15).

According to the second illustrative embodiment, the plurality of optical fibers 1 are inserted into a space between the grooved rod 16 and the tube 17, which is relatively wider than the small-diameter hole. Therefore, efficiency of installation work of the optical fiber is improved as compared with the case where the optical fiber is inserted into the small-diameter hole.

Modification of Second Illustrative Embodiment

Figure 11:
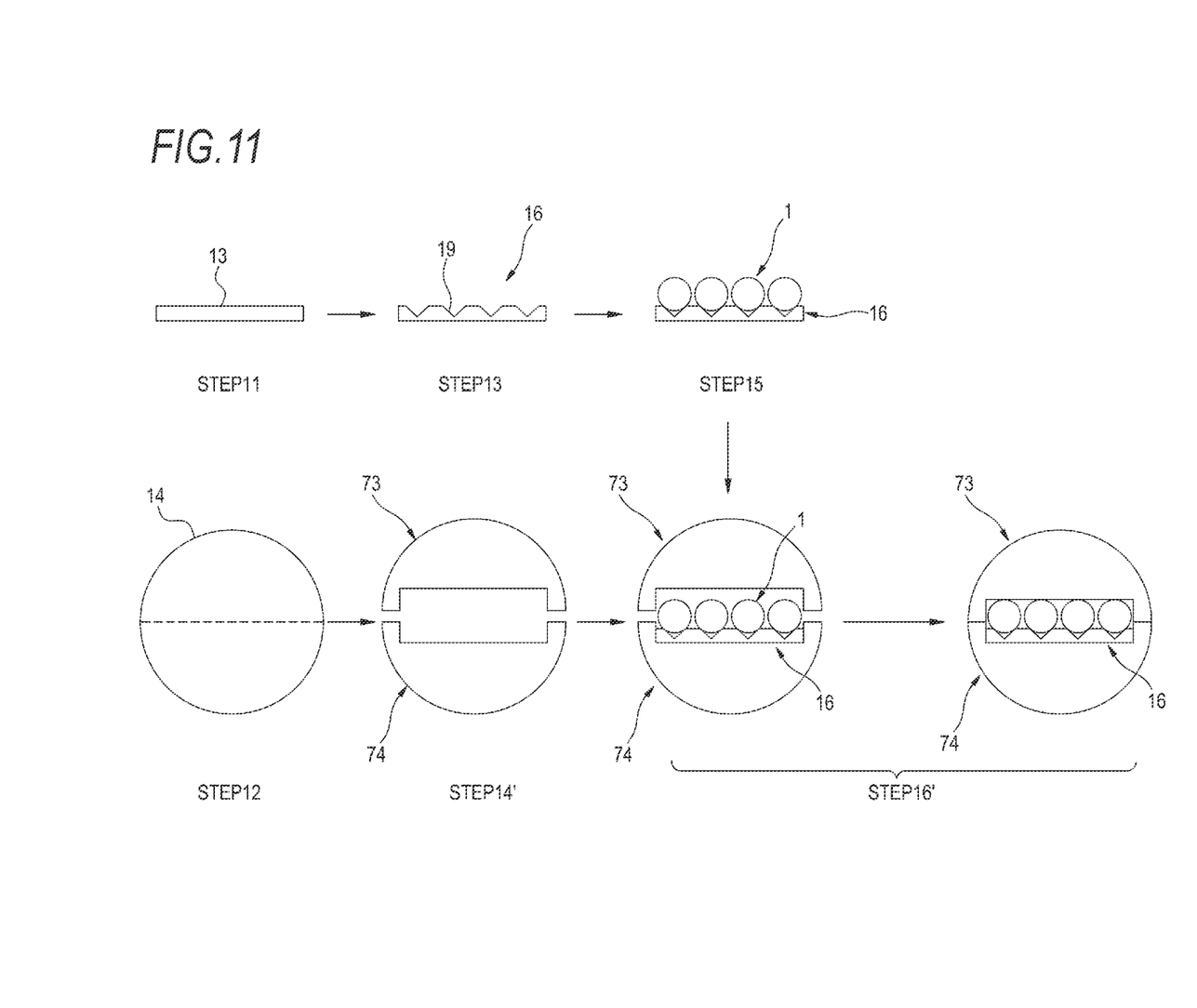
FIG. 11 is a process view of a modification of the manufacturing method in FIG. 9.

The tube 17 may be a member divided into a plurality of parts. FIG. 11 is a process view of a modification of the method for manufacturing the fan-in fan-out device 101. STEPS 11 to 13, STEP 15, STEP 17 and STEP 18 in FIG. 11 are the same as those in FIG. 9. In FIG. 11, elements substantially the same as or corresponding to those in a configuration exemplified in FIG. 9 are denoted by the same reference numerals, and repeated description thereof will be omitted.

As shown in FIG. 11, the hole 18 is formed in the tube 17 prepared in STEP 12, and the tube 17 is divided into a first half body (a third holding member) 73 and a second half body (a fourth holding member) 74 (STEP 14').

After the plurality of optical fibers 1 are arranged in the plurality of grooves 19 of the grooved rod 16 (STEP 15), the grooved rod 16 is arranged between the first half body 73 and the second half body 74 together with the plurality of optical fibers 1 (STEP 16'). Specifically, in a state where the plurality of optical fibers 1 are arranged on the grooved rod 16 respectively along the plurality of grooves 19, the grooved rod 16 is arranged on one of the first half body 73 and the second half body 74, and then the other of the first half body 73 and the second half body 74. Since the grooved rod 16 is sandwiched between the first half body 73 and the second half body 74, the plurality of optical fibers 1 are held by the grooved rod 16, the first half body 73 and the second half body 74.

In this way, in the modification of the second illustrative embodiment, since the tube 17 is divided into the first half body 73 and the second half body 74, the grooved rod 16 and the plurality of optical fibers 1 can be easily arranged between the first half body 73 and the second half body 74 constituting the tube 17. Therefore, work efficiency of the manufacturing method is improved.

Positions of the plurality of grooves 19 are not limited to the long side of the grooved rod 16. The plurality of grooves 19 may be formed on an inner surface of the hole 18 of the tube 17.

Although the present disclosure has been described in detail with reference to specific illustrative embodiments, it is apparent to those skilled in the art that various changes and modifications can be made without departing from the spirit and scope of the present disclosure. In addition, the number, positions, shapes and the like of components described above are not limited to the above illustrative embodiments, and can be changed to numbers, positions, shapes and the like suitable for implementing the present disclosure.

What is claimed is:

1. A method for manufacturing a fan-in fan-out device comprising:
    a first step of arranging a first holding member in a hole of a second holding member, the hole being larger than an outer diameter of the first holding member, and holding a plurality of optical fibers between the first holding member and the second holding member respectively along a plurality of grooves formed on an outer periphery of the first holding member or an inner periphery of the hole of the second holding member, the first holding member and the second holding member being of quartz glass;
    a second step of heating and integrally melting the arranged first holding member, the plurality of held optical fibers, and the second holding member in a portion including an axial end portion of the second holding member; and
    a third step of drawing the melted portion.

2. The method for manufacturing the fan-in fan-out device according to claim 1,
    wherein, the first step includes arranging the first holding member in the hole of the second holding member, after arranging the plurality of optical fibers in the plurality of grooves.

3. The method for manufacturing the fan-in fan-out device according to claim 1,
    wherein, the first step includes arranging the plurality of optical fibers between the first holding member and the second holding member along the plurality of grooves, after arranging the first holding member in the hole of the second holding member.

4. The method for manufacturing the fan-in fan-out device according to claim 1,
    wherein the plurality of grooves are formed on the outer periphery of the first holding member.

5. The method for manufacturing the fan-in fan-out device according to claim 1,
    wherein the plurality of grooves are formed on the inner periphery of the hole of the second holding member.

6. The method for manufacturing the fan-in fan-out device according to claim 1,
    wherein the second holding member includes a third holding member and a fourth holding member, and
    the first step includes holding the plurality of optical fibers by arranging the first holding member between the third holding member and the fourth holding member.

7. The method for manufacturing the fan-in fan-out device according to claim 1,
    wherein the hole has a circular cross section perpendicular to a longitudinal direction.

8. The method for manufacturing the fan-in fan-out device according to claim 1,
    wherein the hole has a rectangular cross section perpendicular to a longitudinal direction.

9. The method for manufacturing the fan-in fan-out device according to claim 1,
    wherein the groove has a V-shaped cross section perpendicular to the longitudinal direction.

10. A fan-in fan-out device comprising:
    a plurality of optical fibers; and
    a holding portion holding the plurality of optical fibers in a bundled state,
    wherein the holding portion comprises:
        a large-diameter portion;
        a reduced-diameter portion extending from the large-diameter portion while reducing in diameter; and
        a small-diameter portion extending from the reduced-diameter portion,
    wherein the large-diameter portion comprises:
        a first holding member; and
        a second holding member having a hole larger than an outer diameter of the first holding member, the first holding member and the second holding member being of quartz glass,
    wherein an outer periphery of the first holding member or an inner periphery of the hole of the second holding member has a plurality of grooves,
    wherein the plurality of optical fibers are held between the first holding member and the second holding member respectively along the plurality of grooves in the large-diameter portion, and wherein the first holding member and the second holding member are melted and integrated with each other in the small-diameter portion.

* * * * *